United States Patent [19]

Foley et al.

[11] Patent Number: 4,875,527
[45] Date of Patent: Oct. 24, 1989

[54] DUAL IMPLEMENT HITCH ASSEMBLY

[75] Inventors: Daniel M. Foley, Plesant Hill; Michael D. Snyder; John D. Long, both of Ankeny, all of Iowa

[73] Assignee: Deere & Company, Moline, Ill.

[21] Appl. No.: 241,668

[22] Filed: Sep. 8, 1988

[51] Int. Cl.[4] .......................................... A01B 63/00
[52] U.S. Cl. ...................................... 172/248; 172/313
[58] Field of Search ............... 172/311, 625, 626, 644, 172/679, 248, 313, 310; 280/411 R, 411 A, 411 C, 412, 413, 656

[56] References Cited

U.S. PATENT DOCUMENTS

| 2,971,774 | 2/1961 | Bartel | 280/412 |
|---|---|---|---|
| 3,162,459 | 12/1964 | Marmorine et al. | 280/656 |
| 3,415,541 | 12/1968 | Thiessen | 280/413 |
| 3,544,130 | 12/1970 | Hayes | 280/412 |
| 3,544,131 | 12/1970 | Pennington | 280/412 |
| 3,675,945 | 7/1972 | Fischer | 280/411 C |
| 3,738,682 | 6/1973 | Ritter | 280/412 X |
| 3,893,283 | 7/1975 | Dandl | 56/6 |
| 3,982,773 | 9/1976 | Stufflebeam et al. | 280/656 |
| 4,178,010 | 12/1979 | Gerber | 280/412 |
| 4,213,628 | 7/1980 | Hardesty | 280/412 |
| 4,344,639 | 8/1982 | Pollard | 280/411 C |

FOREIGN PATENT DOCUMENTS 576353 5/1933 Fed. Rep. of Germany ...... 172/313

Primary Examiner—Mitchell J. Hill

[57] ABSTRACT

A hitch assembly for joining two implements together for side-by-side field operations. Half of the hitch assembly is carried by each implement drawbar and consists of a collapsable linkages pivotally mounted to the drawbar in a cantilvered fashion. Springs floatingly suspend each linkage for ease for movement between its collapsed stored configuration and an unfolded, extended configuration assembled with the other linkage. Equalizer linkages extend between the assembled hitch assembly and the two implements to maintain fore-and-aft alignment of the two implements and bumper-cable means control the side-to-side spacing of the two implements.

8 Claims, 6 Drawing Sheets

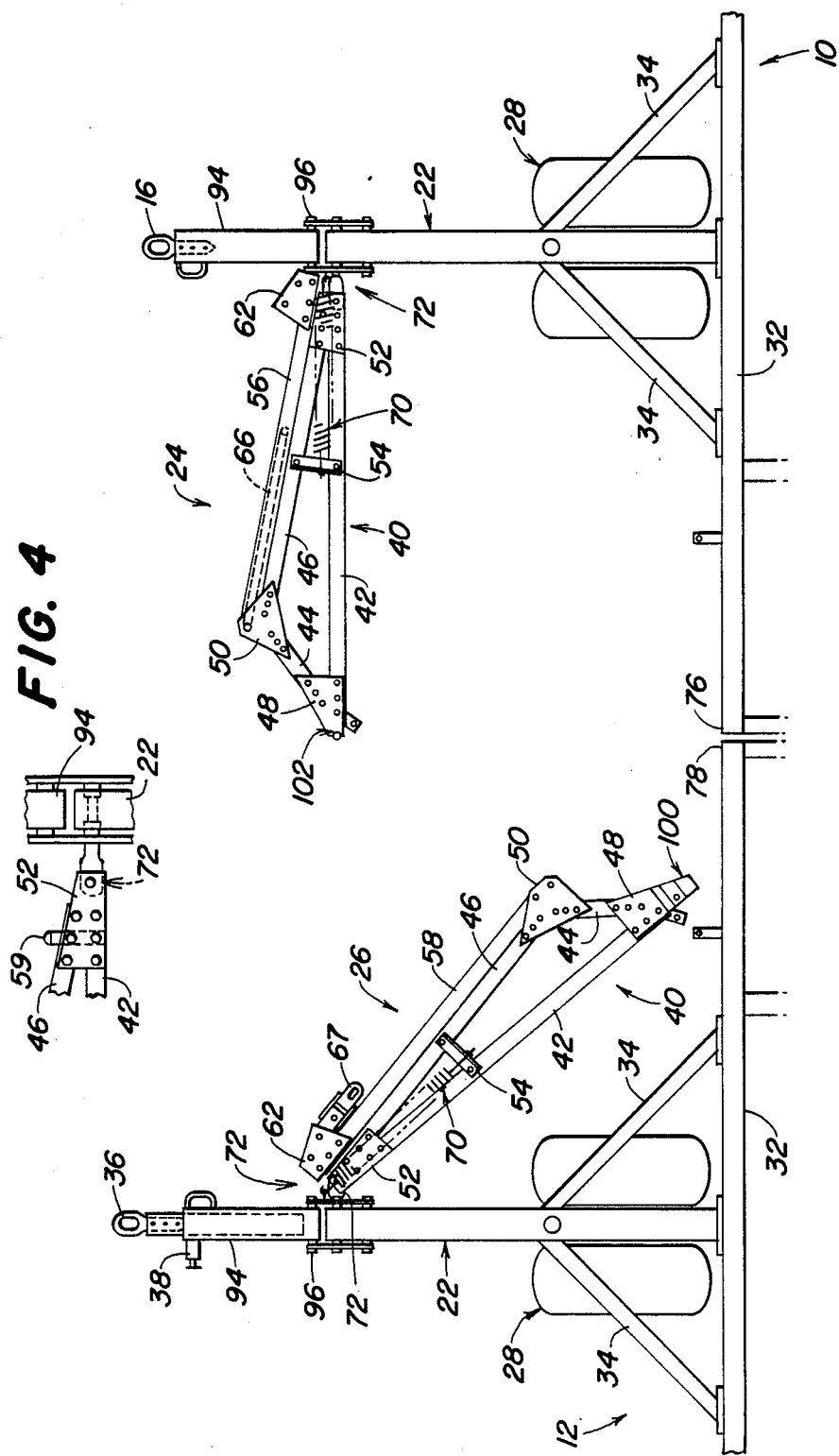

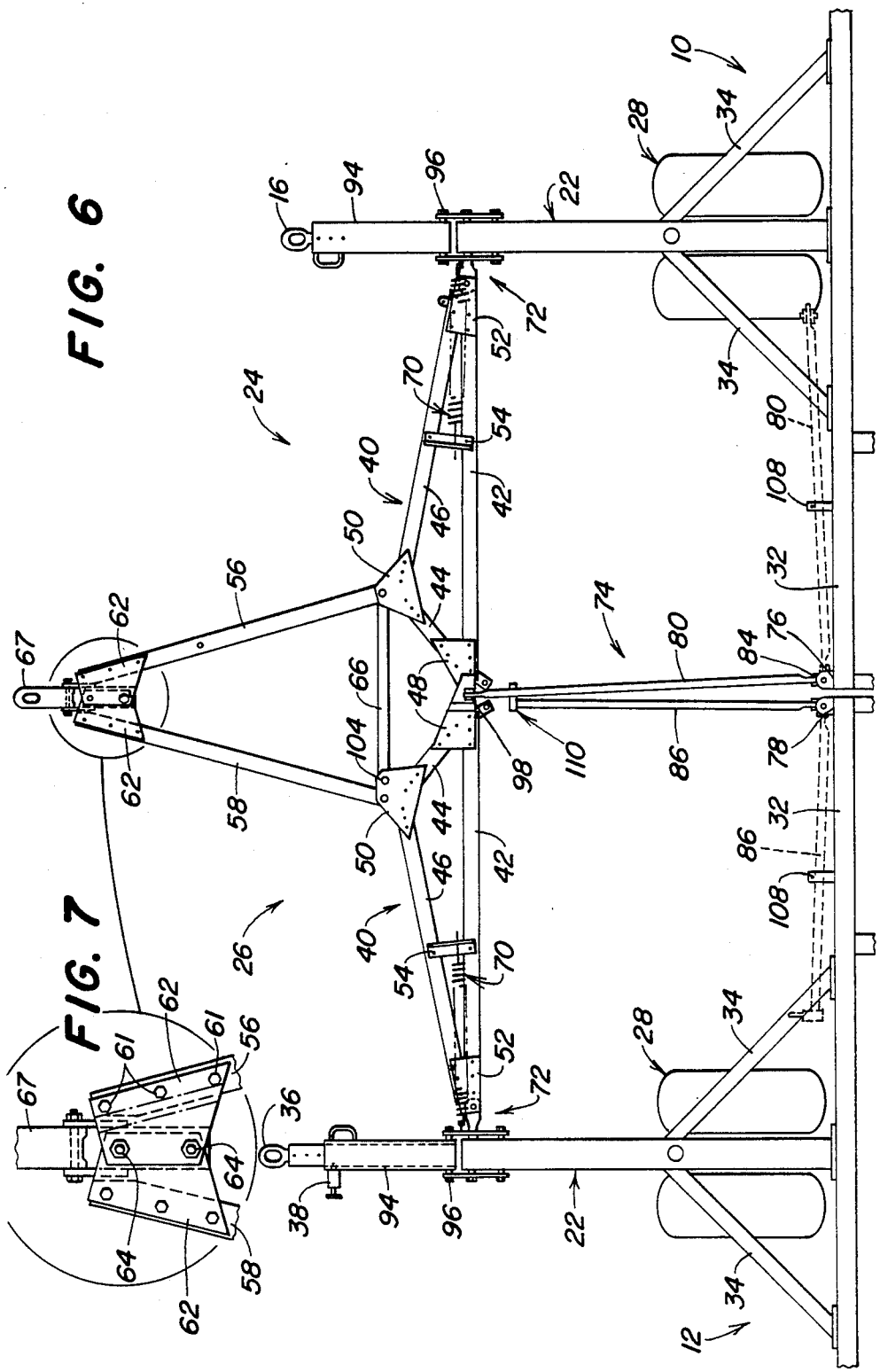

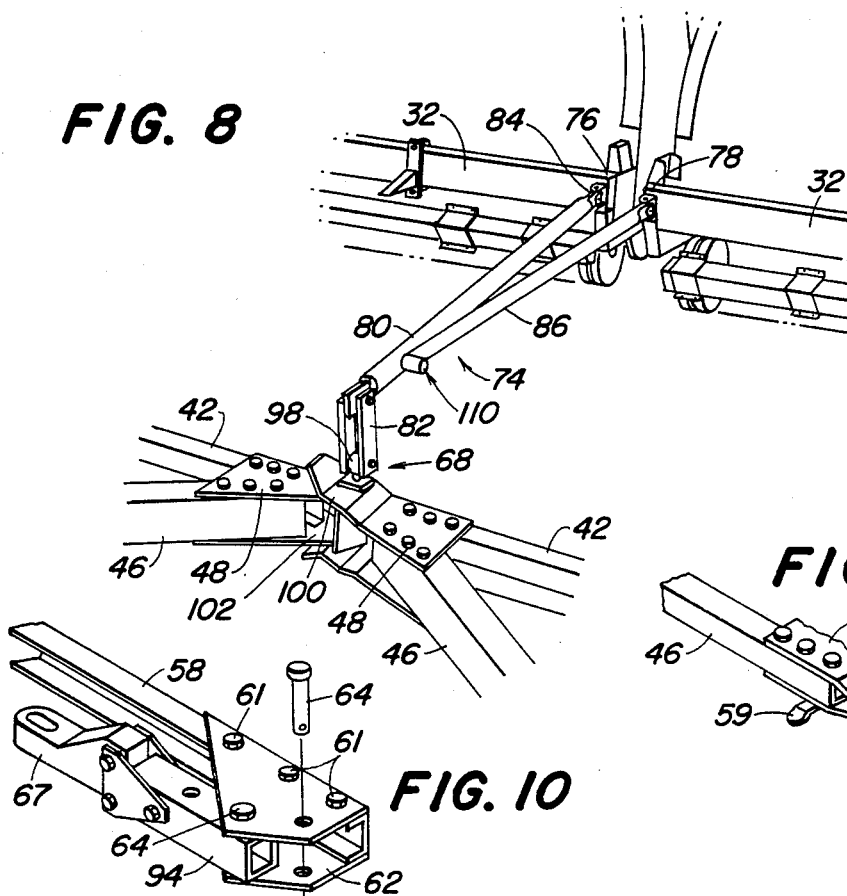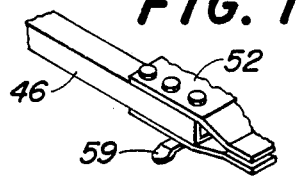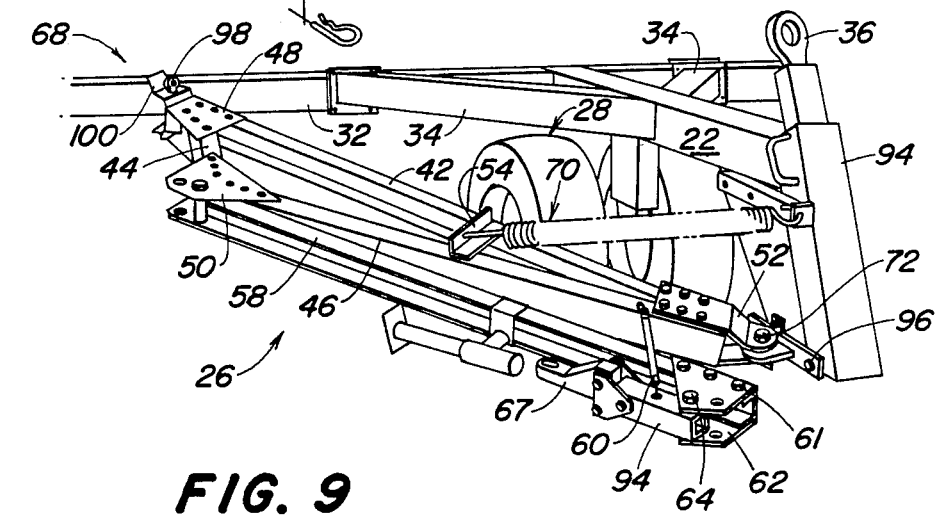

4,875,527

DUAL IMPLEMENT HITCH ASSEMBLY

FIELD OF THE INVENTION

One present invention relates to a hitching assembly for drawn implements, such as grain drills, and particularly relates to a drawbar structure adapted to tow two such implements in a side-by-side field operating configuration.

DESCRIPTION OF THE PRIOR ART

Grain drills, seeders and similar types of implements utilized by farmers are commonly provided in widths which permit road transportation between fields and farm operations. Since the operating width of these implements is restricted by the size of the roads over which they must travel, there is a desire on behalf of the farmers to use two or more implements in a side-by-side relationship when planting. Consequently, manufacturers have sought to meet this desire through offering coupling structures which permit two or more implements to be joined together in side-to-side relationships, yet be towed over roads in a trailing relationship.

Various types of coupling arrangements have been devised to permit use of two or more implements. However, those arrangements often require separate hitch parts which must be carried along with the implement and/or special tools to make the conversion between the trailing transport and side-by-side field configurations. Many of these arrangements also require substantial effort by several people to assemble or disassemble. Further, such arrangements are often bulky, cumbersome, and can potentially interfere with the operation of the implements.

SUMMARY OF THE INVENTION

The present invention is directed to an implement coupling assembly. It is comprised of a hitch assembly that couples the drawbars of two implements together for side-by-side field operations. The coupling structure consists of linkages carried on each implement's drawbar which can be joined together to form a separate hitch assembly. The linkages are pivotally mounted on the two drawbars in a spring loaded, floating and cantilevered fashion that permits them to be easily swung into and out of hitching position by one person. During road transport, the hitch assembly is carried on the drawbars in a collapsed configuration so as to not interfere with the towing operation.

BRIEF DESCRIPTION OF THE DRAWINGS

In the drawings:

FIG. 3 is a plan view showing in part the implements in their side-by-side relationship with the components of the right hitch assembly structure moved into position for coupling with the left half of the assembly.

FIG. 4 is an enlarged view of the ball and socket connection between one hitch assembly structure and the drawbar.

FIG. 6 illustrates the hitch assembly structures as assembled for field operation.

FIG. 7 is an enlarged view of the assembled hitch structure illustrating the bracket structure utilized for joining the two hitch assembly halves at their forward ends.

FIG. 8 is an elevational perspective of the equalizer bar structure which extends between the hitch assembly and the front inside corner of each implement.

FIG. 9 is a perspective view of the left-hand portion of the hitch assembly in its transport configuration.

FIG. 10 is an enlarged view of the bracket and clevis structure carried on the left hitch assembly.

FIG. 11 is an enlarged view of the supporting plate carried by the triangular linkage for supporting the drawbar link during transport.

DESCRIPTION OF THE PREFERRED EMBODIMENT

Figure 1:
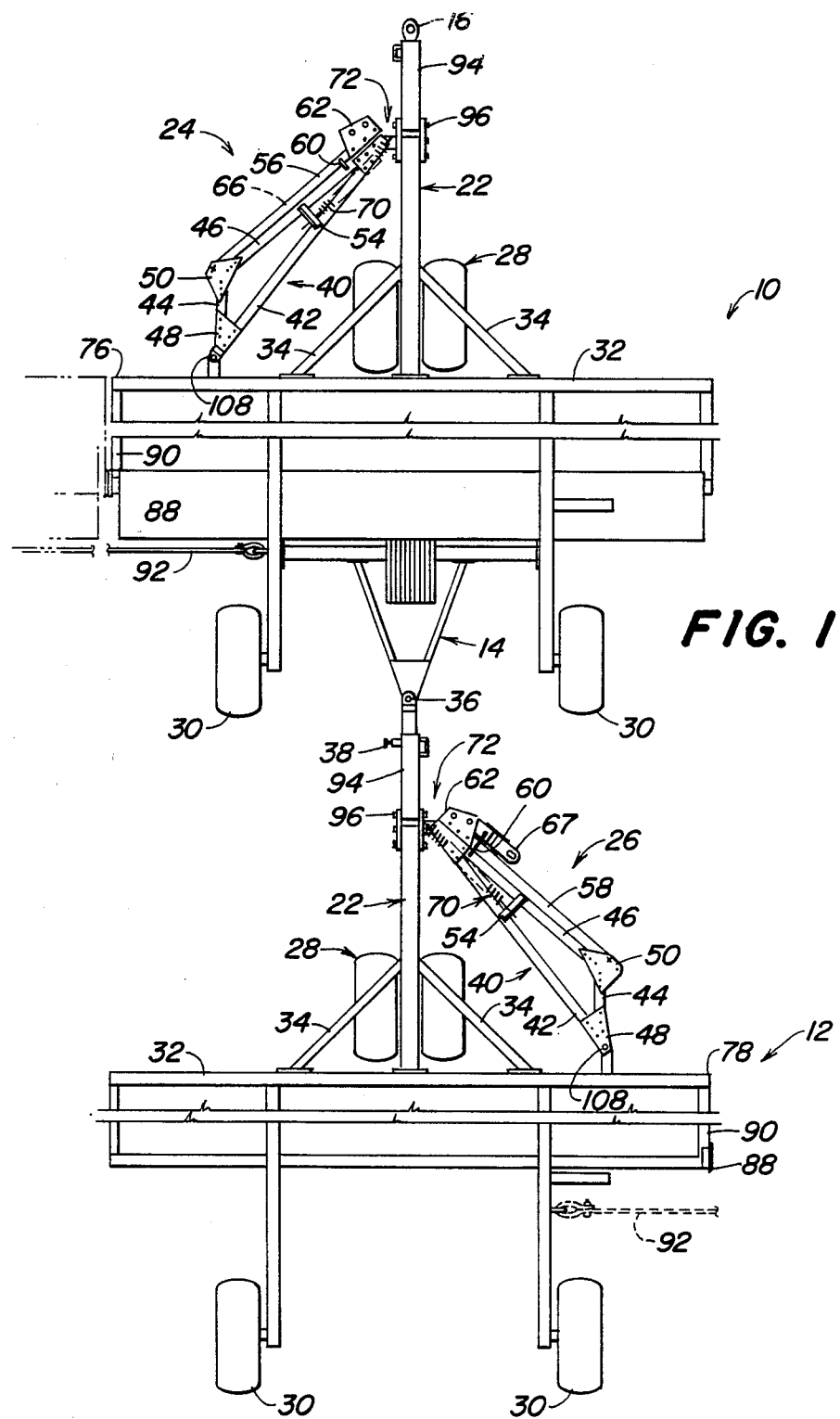
FIG. 1 is a schematic plan view of two implements in road transport configuration illustrating the hitch assembly structure of the present invention in its stored configuration.

Referring now to FIG. 1, there is schematically illustrated a pair of grain drills 10 and 12 arranged in tandem fashion for road transport. A transport hitch 14 connects the second drill 12 to the rear of the first drill 10 for towing. While not shown, a tractor or similar traction vehicle would be attached to the clevis hitch 16 of the first drill 10 to tow drills 10 and 12.

Each grain drill 10 and 12 includes a rigid horizontal frame structure which carries a grain storage box 18 and ground-engaging planting tools 20 therebeneath. The center section of each implement and, in particular, the grain boxes are deleted from FIG. 1. While grain drills are shown as the specific implements being coupled, it is to be understood that various types of planting and/or other implements can be utilized with the present invention.

Attached to the fore-and-aft extending drawbar 22 of each drill 10 and 12 is one-half of the linkage structure of the present invention. The front drill 10 carries the right half 24 of the hitch assembly, while the rear drill carries the left half 26 of the hitch assembly. Positioning the two drills 10 and 12 in their side-by-side position permits the hitch assemblies 24 and 26 to be joined as shown in the series of FIGS. 3, 5 and 6.

The drills 10 and 12 are carried upon tandem front support wheels designated 28 and laterally spaced rear wheels designated 30. Each drill 10 and 12 is equipped with its own drawbar 22 which extends forwardly from a front transverse frame member 32 to a clevis hitch. The drawbars 22 are coupled with their respective front frame cross member 32 through angular braces 34. The clevis hitch 36 of the drill to be positioned as the trailing drill 12 in the transport mode is provided with the ability to telescope when a spring loaded latch 38 is released. This telescoping capability permits the operator to couple the drawbar clevis 36 of the rear drill 12 to the hitch 14 carried on the front drill 10 without making repeated trips to the tractor to precisely position laterally and along a fore-and-aft line the rear hitch 14 of the front drill 10 with the opening in the clevis 36 of the rear drill.

Figure 5:
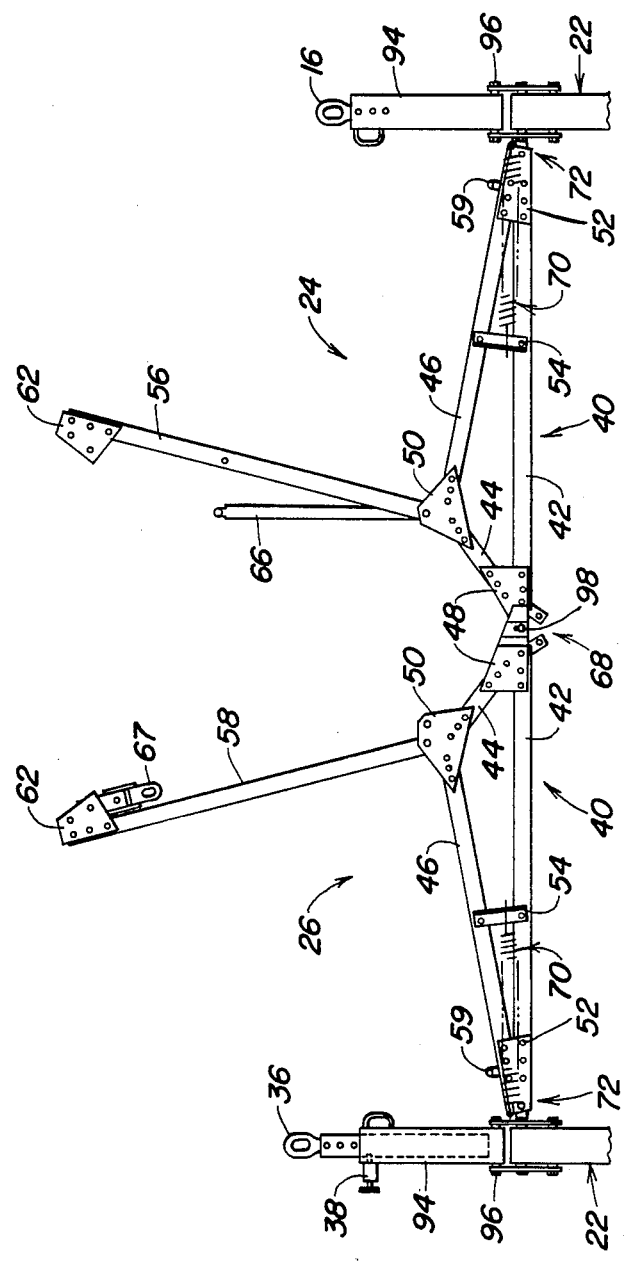
FIG. 5 is another plan view similar to FIG. 3, but illustrating the halves of the hitch assembly structure joined at one corner with the drawbar links and cross brace partially swung into their assembly positions.

FIGS. 3, 5 and 6 well illustrate the components of the right-and left-hand hitch assemblies 24 and 26, as well as the sequence of connecting them for field towing. Each half of the hitch structure 24 and 26 includes a triangularly-shaped linkage structure 40, with each structure being universally pivotally connected at its first corner and to its drill's drawbar 22 for swinging movement between the position illustrated in FIGS. 1 and 6. The triangularly-shaped member 40 is rigidly formed of links 42, 44 and 46 joined together by brackets 48, 50 and 52. The bracket 52 provides a first corner for connecting the triangularly-shaped member 40 to its drawbar 22, while bracket 50 provides a second corner for carrying a drawbar link. Bracket 48 provides a third corner on each triangularly-shaped member for joining the two triangular members 40 together. Each triangular linkage 40 also carries a cross member 54 for reinforcing the triangular structure formed by the links 42, 44 and 46.

At the forward or second corner of each triangular structure 40 and pivotally coupled to bracket 50 are drawbar links 56 and 58 which, as illustrated in FIGS. 3, 9 and 11, are folded during transport next to link 46 and are supported by the plate 59 which is carried on the bracket 52. Bungy straps 60 or similar means can be used to secure the drawbar links 56 and 58 to their respective triangular link 46. Bolts 61 secure the tow bar links 56 and 58 to mating bracket halves 62 in the preferred embodiment. When the triangular linkages 40 of the hitch assembly are to be joined for field operation, the links or elongated members 56 and 58 are swung together at their forward ends to form an angled brace towing arrangement, which in turn is coupled to the tractor. See FIGS. 5 and 6. When coupling the links 56 and 58, the clevis bar 67 illustrated in FIG. 10 is swung forward to the coupling position illustrated in FIG. 7 and the bracket halves 62 then joined with the pins 64 along the hitch centerline.

A third link or rigid member 66 is pivotally connected to the bracket 50 at the corner of the right triangular structure 40. This link 66, when swung from the position illustrated in FIG. 3 to that illustrated in FIG. 6, is coupled with the other bracket 50 and provides stability to the center section of the hitch assembly.

A pin coupling means 68 (see FIGS. 5, 8 and 9) is used to connect the brackets 48 of the two hitch assembly halves 24 and 26 together.

Looking now to FIGS. 3 and 9, there is shown a tension spring structure 70 which supports each hitch assembly half 24 and 26 above the ground. The tension spring means 70 is mounted between the cross member 54 and drawbar 22 of each assembly 24 and 26 and floatingly suspends each assembly 24 and 26 in cantilevered fashion. This spring structure 70 also permits easy swinging movement of the assemblies 24 and 26 about their respective universal connections 72 and the drawbar 22.

FIGS. 6 and 8 illustrate an equalizer bar structure 74 which interconnects the center portion of the assembled hitch with the inside front corners 76 and 78 of the drills 10 and 12. The bar structure 74 includes a first member 80 pivotally connected to a short link 82 which in turn is pivotally coupled with the bracket structure 48 that serves to join the adjacent corners of each hitch assembly. The other end of the link 80 is coupled through a universal coupling 84 to the front inside corner 76 of the right drill 10. Provision is made near the front of the equalizer bar 80 to pivotally connect a second equalizer bar 86. The second bar 86 extends rearwardly to the front inside corner 78 of the left drill 12. These equalizer bars 80 and 86 provide a connection between the inside front corners 76 and 78 of the drills to maintain the front center corners 10 and 12 of the drill in fore-and-aft alignment.

Figure 2:
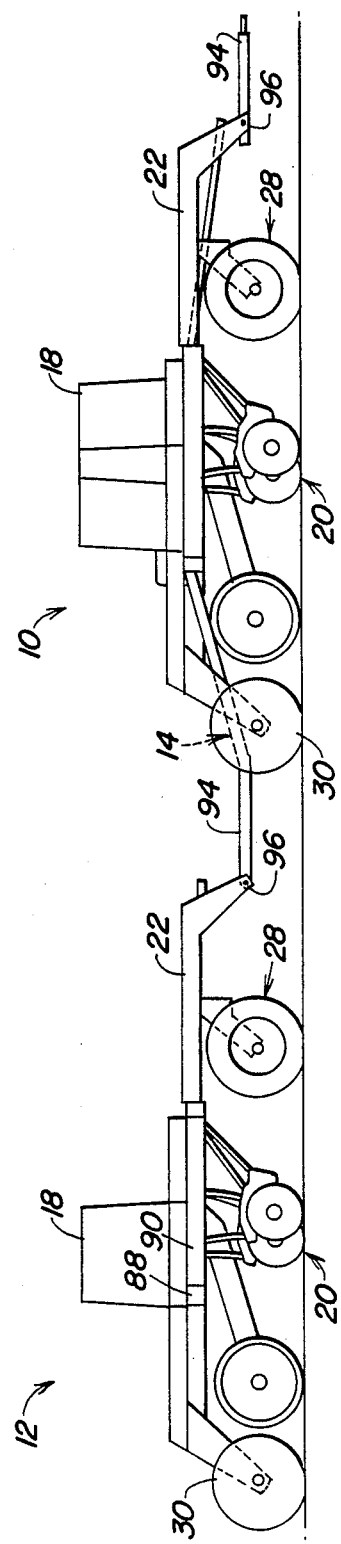
FIG. 2 is a side view of the two implements and hitch structure illustrated in FIG. 1.

To prevent the drills 10 and 12 from moving too closely together during field operations which could cause frame damage or crop row misalignment, a bumper means or arrangement 88 has been added to the vertical surfaces of each inside fore-and-aft frame member 90, see FIGS. 1 and 2. To restrict side-to-side separation of the drills 10 and 12 during field operations, a cable 92, as shown in FIG. 1, can then be attached between fore-and-aft frame members of drills 10 and 12.

At the front of each rigid drawbar 22 is a tongue 94 which is carried on a horizontal pivot 96. Each tongue 94 is carried at the lower forward end of its drawbar 22 to position its clevis 16 and 36 at the same level as the drawbar hitch connection of the tractor. The transverse pivotal connection 96 permits each tongue 94 to fold upwardly and rearwardly into the position illustrated in FIG. 9 when the drills 10 and 12 are operated in their side-by-side configuration.

To review the operation of the invention, we will assume that initially the hitch assembly halves 24 and 26 are in their transport position as illustrated in FIGS. 1 and 2. In this position, the tension spring structures 70 will be carrying the outer ends of each hitch assembly 24 and 26 in a cantilevered fashion to prevent them from dragging on the ground. To join the halves 24 and 26 for field operations, the operator will first shift one assembly half to a transversely oriented position as illustrated for half 24 in FIG. 3. Movement of each hitch half 24 and 26 to this position is easily achieved by one man due to the floating spring structure 70.

Next the operator moves the left-hand hitch assembly 26 to a similar position so that a pin 98 can be inserted through the receiving portion 100 of the bracket 48 of the left assembly 12 and the insert portion 102 of the bracket 48 carried by the right assembly 10. See FIGS. 8 and 9. With the pin 98 now connecting the corners of the two triangular structures 40, the assembly will be joined as shown in FIG. 5. Next the operator loosens the rubber bungy straps 60 which secure the tow bar links 56 and 58 to plates 59 (FIG. 9). Similarly, the pin 104 is removed from links 56 and 66 carried on the right hitch assembly structure 24 to permit the rigid cross link 66 to be swung into its assembly position. With these three links 56, 58 and 66 now free to swing as shown in FIG. 5, the operator moves the clevis 36 to the forward position illustrated in FIGS. 6 and 7, then swings the links 56 and 58 to the positions illustrated in FIGS. 6 and 7 and inserts the pins 64 into the bracket halves 62 to form the drawbar connection. At the same time, the pin 104 is inserted into the bracket 50 to secure the cross link 66 in place.

With the hitch now assembled as shown in FIG. 6, the operator can turn his attention to installing the equalizer bars 80 and 86. See FIGS. 6 and 8.

In transport, the equalizer bars 80 and 86 are generally stored on their respective drills 10 and 12 as illustrated in phantom in FIG. 6. For side-by-side drill operations, the operator would remove the pins 108 which hold each of the equalizer bars 80 and 86 to its drill's rigid horizontal frame and swing it into the position illustrated in FIGS. 6 and 8. Then, the equalizer bar 80 would be connected to link 82 which is connected to pin 98, the pivotal connection between the hitch halves 24 and 26. Next, the shorter equalizer bar 86 carried by the left-hand drill 12 would be connected to the front portion of the longer bar 80 by inserting the pin 110 into the opening provided in the first bar 80.

With the hitch assembly now completed, the operator would swing each drawbar tongue 94 upwardly and rearwardly about its pivotal connection on its drawbar 22 and into a position similar to that illustrated in FIG. 9. Next the drill's cable 92 would be connected between the drill frames to restrict movement away from one another during operation.

With these connections made, the drills are ready for side-by-side field operation. Only one person has been required to make the assembly and no special tools or parts were required beyond the parts carried by the drills.

To return the drills to the transport configuration requires only that the series of assembly steps discussed above be reversed. Therefore, it need not be discussed in detail herein.

The present invention provides a simple and inexpensive hitch assembly that can permit one operator to quickly convert his drills or similar implements between transport and side-by-side field operation.

We claim:

1. A dual implement hitch assembly for coupling first and second rigid horizontal frames for side-by-side field operation, each frame having a fore-and-aft extending rigid drawbar, the hitch assembly comprising:
   first hitch structure carried to the left side of the first drawbar and a second hitch structure carried to the right side of the second drawbar, each hitch structure including
   a triangularly-shaped member having first, second and third corners, the first corner being pivotally connected to the drawbar;
   an elongated member pivotally connected at one of its ends to the second corner;
   means connectable to a traction vehicle carried by one of the elongated members at its end opposite its connection with the triangularly-shaped member;
   and means for connecting the two hitch structures together including coupling means for connecting the second corners of the triangularly-shaped members together and for joining the third corners of the triangularly-shaped members together, said connecting means also adapted to join the elongated members together at their ends opposite their respective connections to a second corner.

2. Hitch assembly for towing in side-by-side relationship two implements, each having a fore-and-aft extending drawbar connected to a rigid, horizontally extending frame, said drawbars being transversely spaced apart when the implements are in their side-by-side position, said assembly comprising:
   first triangularly-shaped structure pivotally connected to the left side of one drawbar;
   second triangularly-shaped structure pivotally connected to the right side of the other drawbar;
   first connecting means pivotally interconnecting one corner of each triangularly-shaped structure;
   a rigid member extending between and connected to a second corner of each triangularly-shaped structure;
   a pair of two bar links, one end of each of said pair of tow bar links connected to a respective second corner of a triangularly-shaped structure; and
   means carried at the other end of said each tow bar links for attaching said other ends together and to a traction vehicle.

3. The invention defined in claim 2 wherein a spring means is attached between each drawbar and a mid-portion of its respective triangularly-shaped structure to yieldably support the structure in a cantilevered manner on the drawbar.

4. The invention defined in claim 2 wherein each implement includes a fore-and-aft extending member and frame, bumper means are provided between the fore-and-aft extending frame members to cushion abutting movement of the implements.

5. The invention defined in claim 4 wherein a connecting means extends between the frames to limit movement of the implement frames away from one another.

6. The invention defined in claim 2 wherein the drawbars each include a tongue connectable to a traction vehicle, which tongues are pivotally connected to their respective drawbars and rearwardly swingable about those pivotal connections.

7. The invention defined in claim 2 wherein a rigid link extends between the hitch assembly and one rigid horizontal frame and a second rigid link extends between the first link and the other horizontal frame.

8. The invention defined in claim 7 wherein the first and second links are connected to the frames with couplings permitting movement about two axes each.

* * * * *